May 19, 1925.
J. W. HARRIS
MANURE LOADER
Filed Nov. 13, 1924
1,538,552
3 Sheets-Sheet 1
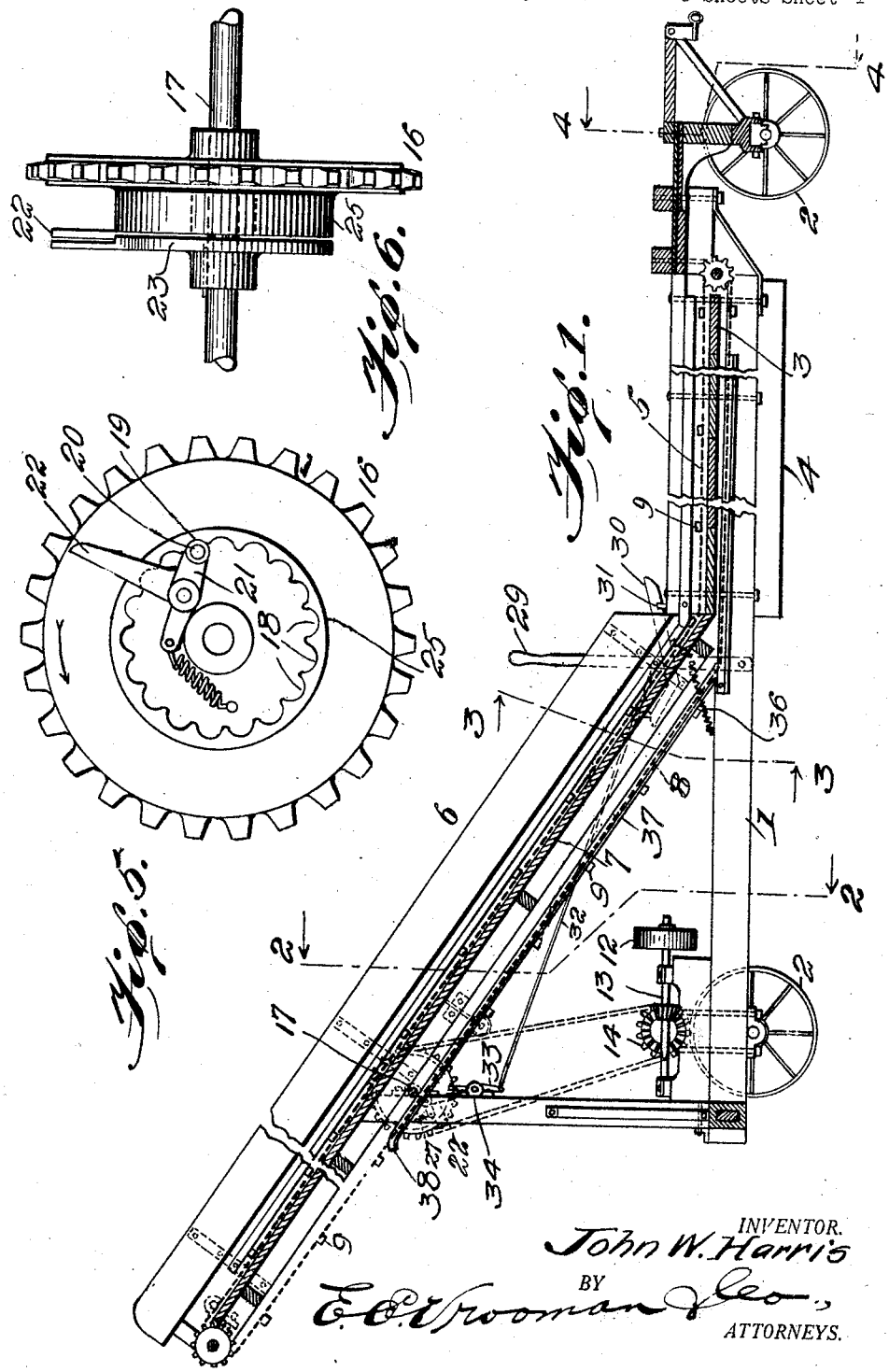

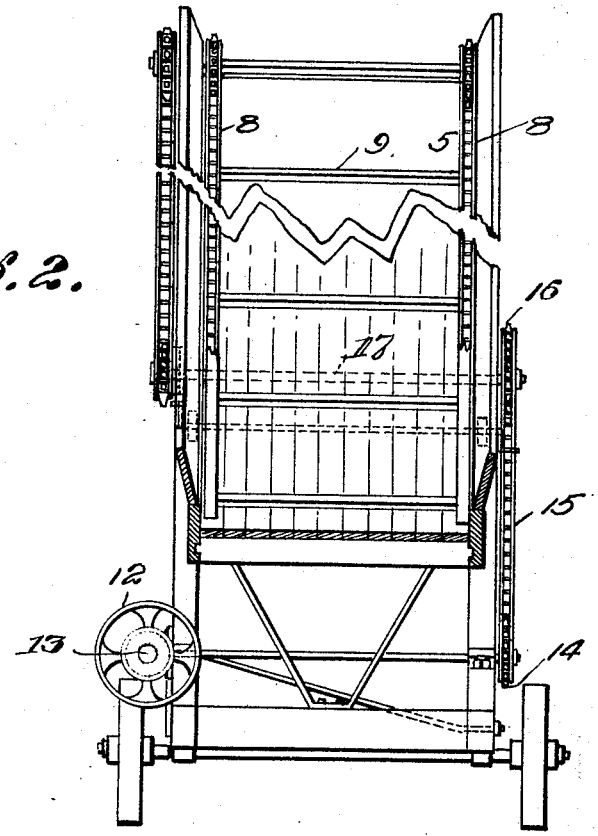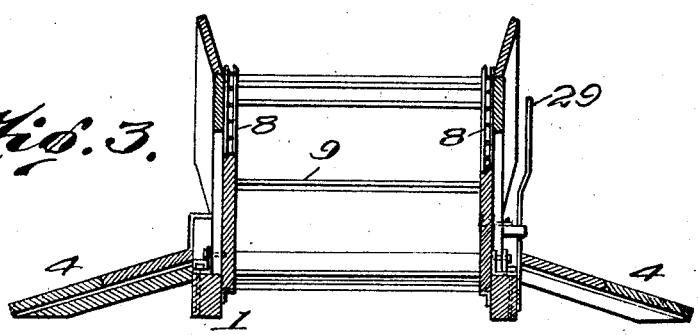

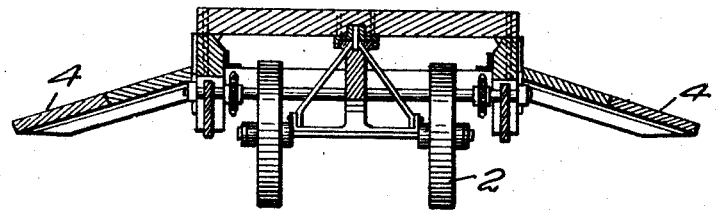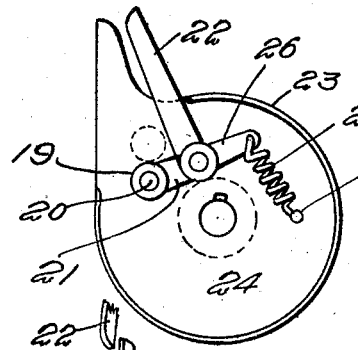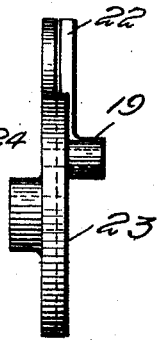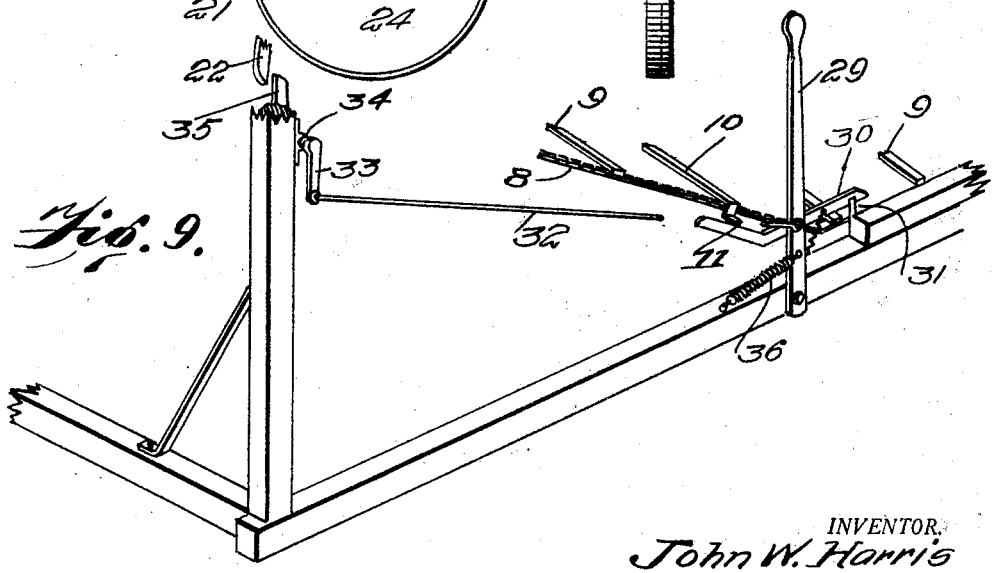

Patented May 19, 1925.

1,538,552

UNITED STATES PATENT OFFICE.

JOHN WILLIAM HARRIS, OF WESLEY, IOWA.

MANURE LOADER.

Application filed November 13, 1924. Serial No. 749,687.

*To all whom it may concern:*

Be it known that I, JOHN W. HARRIS, a citizen of the United States, residing at Wesley, in the county of Kossuth and State of Iowa, have invented certain new and useful Improvements in Manure Loaders, of which the following is a specification, reference being had therein to the accompanying drawings.

This invention relates to a manure loader, and the object of the invention is the construction of a simple and efficient loader, involving a frame and conveyor structure, as well as a clutch mechanism for efficiently operating the conveyor.

Another object of the invention is the improvement of the construction of the mechanism disclosed in my prior United States Patent No. 1,284,667, issued November 12, 1918, for improvements for "manure loaders."

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a longitudinal, sectional view of a manure loader constructed in accordance with the present invention.

Figure 2 is a sectional view, taken on line 2—2, Fig. 1, and looking in the direction of the arrows.

Figure 3 is a sectional view, taken on line 3—3, Fig. 1, and looking in the direction of the arrows.

Figure 4 is a sectional view, taken on line 4—4, Fig. 1, and looking in the direction of the arrows.

Figure 5 is a view, in side elevation, of the idle sprocket wheel of the clutch mechanism.

Figure 6 is a view, in end elevation, of the idle sprocket wheel and part of the clutch mechanism cooperating therewith.

Figure 7 is a view, in elevation, of part of the clutch mechanism, while

Figure 8 is an end view of the same.

Figure 9 is a fragmentary, perspective view of the manure loader, showing particularly the manually-operated lever for setting the clutch mechanism.

Referring to the drawings by numerals, 1 designates the frame that is mounted upon the wheels 2—2, and across the forward end of the frame is formed a solid platform 3 with the runways 4—4 extending from opposite sides of the platform 3 so that a loaded wagon or vehicle can pass up onto the platform 3, or a person standing at the side of the machine can easily throw material, whether it be manure, rocks or gravel, or the like, upon the endless conveyor 5. The conveyor frame 6 is provided with a solid bottom 7, similar to the platform 3, and said conveyor 5 includes sprocket chains 8 that are connected by "flights" or bars 9 and 10 (Fig. 9). The bar 10 is provided with an angle lug 11, formed upon one end for the purpose hereinafter described.

By making the portions 3 and 7 solid the manure is permitted to be dragged or conveyed to the top of the conveyor frame 6 without clogging or "choking" the conveyor as would be the case if portions 3 and 7 were slatted.

A suitable belt-wheel 12 is fixedly secured to shaft 13, and this shaft is geared to sprocket 14 (Fig. 1) upon which is mounted driving chain 15, which chain 15 is mounted upon the idle sprocket wheel 16 (Figs. 2, 5 and 6).

The idle sprocket wheel 16 is loosely mounted upon shaft 17, and this wheel is provided with an inner socketed surface comprising a plurality of sockets 18 (Fig. 5) into which sockets the roller 19 is adapted to extend, this roller being carried on the stud shaft 20, which shaft 20 is supported upon arm 21. Arm 21 is connected to the trigger finger 22, which trigger finger extends beyond the flanged edge 23 of the disc 24, which disc 24 is keyed to shaft 17. The sprocket wheel 16 is provided with an integral, annular band 25, in which is formed said sockets 18. Integral with the trigger finger 22 is also arm 26, to which arm 26 is attached one end of coil spring 27, the other end of coil spring 27 being secured, at 28, to the disc 24. The function of spring 27 is to normally hold roller 19 in one of the sockets 18 so that the idle sprocket wheel 16 is locked upon shaft 17 to cause the conveyor chain and bars or "flights" to be actuated. It will be obvious that during the period the roller 19 is in one of the sockets 18 the conveyor will be traveling, conveying the load from the vicinity of the platform 3 to the upper discharge end of the conveyor frame.

When the operator desires to prevent the travel of the conveyor, he pulls backward on the lever 29, causing the catch 30 (Fig. 9) to engage the lug 31, thereby holding the lever in its set position. A rod 32 is pivotally connected at one end to lever 29 and its other end is pivotally connected to bell crank 33, which bell crank is fixedly secured to shaft 34. Fastened to shaft 34 is a trigger 35 that is adapted to engage trigger finger 22 " kicking " the same so as to disengage roller 19 from the sockets 18.

When driving over the platform 3 with a scoopful of manure the operator dumps it on the platform, then pulls lever 29 which puts loader in gear until lug 11 comes around and disengages member 30, and puts it out of gear automatically. Pulling lever 29 locks member 30 until lug 11 comes around and disengages member automatically.

Guide bars 37, constituting tracks, for the conveyor chains 8 are fastened to the bottom of the conveyor frame 6 and these bars or tracks are bent outwardly at their upper ends 38 so as to permit the chains, with their "flights" or cross bars, to be easily guided upon the bars or tracks 37.

For any general information about this manure loader, that is not fully disclosed in the foregoing description, reference may be had to my prior aforesaid United States Patent No. 1,284,667.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a mechanism of the class described, the combination with a frame, of a conveying mechanism on said frame, said conveying mechanism including a shaft, an idle sprocket wheel on said shaft, said sprocket wheel provided with a plurality of sockets, a disc keyed to said shaft, a trigger finger carried by said disc and provided with a roller adapted to engage said sockets of the sprocket wheel for locking the disc and sprocket wheel together, and manually controlled means for engaging the trigger finger for disengaging the roller from said sprocket wheel.

2. In a mechanism of the class described, the combination with a frame, of a conveying mechanism on said frame and including a sprocket mechanism, said sprocket mechanism including a shaft and an idle sprocket wheel on said shaft, said sprocket wheel provided with a socketed surface, a disc keyed to said shaft against said sprocket wheel, a trigger pivotally mounted on said disc, a pair of arms extending from said trigger, a roller carried by one of said arms and adapted to engage the socketed surface of said sprocket wheel, a spring connected to the other arm for normally holding the roller in engagement with said socketed surface, a trigger mounted on said frame and adapted to engage the trigger finger for causing the roller to disengage the socketed surface of the sprocket wheel, a lever carried by said frame, means connecting said lever to said trigger whereby when the lever is manually operated the trigger will be placed in an inoperative position, and means mounted on said frame and said lever for holding the lever in a set position, and said trigger in position to be engaged by said trigger finger.

3. In a mechanism of the class described, the combination with a frame, of a conveying mechanism on said frame and including a clutch mechanism, said clutch mechanism provided with a trigger finger, a lever pivotally mounted on said frame, a catch pivotally mounted on said lever, a lug on said frame and adapted to engage and hold said catch in a set position, a trigger for engagement with said trigger finger pivotally mounted on said frame, and means pivotally connecting said trigger with said lever whereby when the lever is set by the catch engaging said lug the trigger will be engaged by said trigger finger of the clutch mechanism for operating said clutch mechanism.

In testimony whereof I hereunto affix my signature.

JOHN WILLIAM HARRIS.